(12) United States Patent
Shaikh et al.

(10) Patent No.: US 9,477,223 B2
(45) Date of Patent: Oct. 25, 2016

(54) CONDITION MONITORING SYSTEM AND METHOD

(75) Inventors: Tauseef Ahmed Shaikh, Mumbai (IN); Meera Jitendra Agrawal, Mumbai (IN); Ryan Roaldson, Minden, NV (US)

(73) Assignee: General Electric Company, Schenectady, NY (US)

(*) Notice: Subject to any disclaimer, the term of this patent is extended or adjusted under 35 U.S.C. 154(b) by 504 days.

(21) Appl. No.: 13/232,531

(22) Filed: Sep. 14, 2011

(65) Prior Publication Data
US 2013/0063262 A1    Mar. 14, 2013

(51) Int. Cl.
G08B 21/00        (2006.01)
G05B 23/02        (2006.01)

(52) U.S. Cl.
CPC ....... *G05B 23/0272* (2013.01); *G05B 23/0216* (2013.01)

(58) Field of Classification Search
CPC .... G08B 3/10; G08B 25/14; G08B 13/1672; G08B 21/12; G08B 25/10; G05B 23/0216; G05B 23/0272; G06Q 10/087; G06Q 20/203; G06Q 10/08; G06Q 10/0875; G06Q 10/06; G06F 9/4443
USPC .......... 340/540, 3.1, 6.1, 8.1, 506, 507, 524, 340/525, 531, 533, 539.2; 702/35, 81, 182, 702/183, 184, 185, 188; 700/108, 109, 110; 703/2; 705/1.1, 28
See application file for complete search history.

(56) References Cited

U.S. PATENT DOCUMENTS

| | | | |
|---|---|---|---|
| 5,566,092 A | 10/1996 | Wang et al. | |
| 5,926,177 A * | 7/1999 | Hatanaka et al. | 715/747 |
| 6,809,642 B1 * | 10/2004 | Brenner | 340/506 |
| 7,088,255 B2 | 8/2006 | Ridolfo et al. | |
| 7,308,385 B2 * | 12/2007 | Wegerich et al. | 702/183 |
| 7,539,597 B2 | 5/2009 | Wegerich et al. | |
| 2001/0013832 A1 | 8/2001 | Chavand | |
| 2002/0054101 A1* | 5/2002 | Beatty | 345/764 |
| 2002/0152056 A1* | 10/2002 | Herzog et al. | 703/2 |
| 2003/0023518 A1* | 1/2003 | Spriggs et al. | 705/28 |
| 2006/0036403 A1* | 2/2006 | Wegerich et al. | 702/183 |
| 2007/0156266 A1* | 7/2007 | Jensen | G05B 15/02 700/83 |
| 2008/0036336 A1 | 2/2008 | Salem et al. | |
| 2009/0077055 A1 | 3/2009 | Dillon et al. | |
| 2010/0082272 A1 | 4/2010 | Lane, Jr. et al. | |
| 2010/0089159 A1 | 4/2010 | Younsi et al. | |
| 2010/0156654 A1 | 6/2010 | Bullemer et al. | |
| 2010/0211334 A1 | 8/2010 | Sheikman et al. | |
| 2011/0144777 A1 | 6/2011 | Firkins et al. | |

OTHER PUBLICATIONS

European Search Report and Opinion issued in connection with corresponding EP Application No. 12183885.8 on Apr. 21, 2016.

* cited by examiner

*Primary Examiner* — Sisay Yacob
(74) *Attorney, Agent, or Firm* — Armstrong Teasdale LLP

(57) ABSTRACT

Embodiments of a condition monitoring system and method provide an interface with visual aids that facilitate diagnosis of problems on an asset (e.g., a turbine, motor, pump, etc.). In one embodiment, the visual aids display fault data that corresponds to a fault condition such as bearing failure and/or shaft misalignment. The fault data is collected by sensors on the asset and processed by the condition monitoring system for use with the interface. In one example, the interface can include one or more icons, which represent fault conditions for the asset, and which an end user may select to display the visual aids on the interface. Selection amongst the different icons will change the visuals aid, the fault data, and other aspects of the interface to enable diagnosis and promote effective maintenance of the asset.

23 Claims, 3 Drawing Sheets

CONDITION MONITORING SYSTEM AND METHOD

BACKGROUND OF THE INVENTION

The subject matter disclosed herein relates to condition monitoring systems and, more particularly, to embodiments of a condition monitoring system and method that arrange data on an interface based on fault condition.

Although preventive maintenance can reduce the occurrence of machine breakdown, it also has some problems. First, the appropriate period between maintenance procedures is very difficult to determine because machines and their components do not necessarily fail at regular intervals. Second, production time is lost because it is prudent to examine as many components as possible during the maintenance period. Third, parts in reasonable condition are often replaced unnecessarily.

Machine monitoring and diagnostics can be seen as a decision-support tool which is capable of identifying the cause of failure in a machine component or system, as well as predicting its occurrence from a symptom. Without accurate direction and identification of the machine fault, maintenance and production scheduling cannot be effectively planned and the necessary repair task cannot be carried out in time. Therefore, machine monitoring and diagnostics is essential for an effective predictive maintenance program.

The ultimate goal of using machine monitoring and diagnostics is to increase equipment availability, and in addition, reduce maintenance and unexpected machine breakdown costs. In order to maximize availability, one has to increase reliability by maximizing the machine uptime and, at the same time, increase maintainability by minimizing the mean time to repair. As a result of constant monitoring and diagnostics, the frequency of unexpected machine breakdown is significantly reduced, and machine problems can be pinpointed immediately.

Machine monitoring and diagnostics can be done by simply listening to the sound generated during machine operation or visually examining the quality of machined parts to determine machine condition. In such a situation, however, the identification of a machine fault is totally dependent on the experience of the operator or engineer. Besides, many machine faults are not accurately assessed by relying only on visual or aural observations, especially during operation (e.g., wear and crack in bearings and gearboxes). Therefore, more sophisticated signal processing techniques, such as vibration analysis, oil analysis, acoustic emission, infrared, and ultrasound, have been developed to help the maintenance technician and engineer detect and diagnose machine failures.

The discussion above is merely provided for general background information and is not intended to be used as an aid in determining the scope of the claimed subject matter.

BRIEF DESCRIPTION OF THE INVENTION

A condition monitoring system is disclosed, wherein the condition monitoring system has features and components that arrange and display data on an interface based, at least in part, on fault conditions for an asset. An advantage that may be realized in the practice of some disclosed embodiments of the condition monitoring system is to improve diagnosis of fault conditions during operation of the asset by, in one example, providing a comprehensive set of visual aids associated with the fault condition.

In one embodiment, a condition monitoring system is described that includes a processor, memory coupled to the processor, and one or more executable instructions stored on the memory and configured to be executed by the processor. The executable instructions includes instructions for receiving an input that identifies a fault condition for an asset and for selecting fault data in response to the input. The executable instructions also includes instructions for displaying the fault data in a visual aid on an interface.

In another embodiment, an apparatus for monitoring operation of an asset is described. The apparatus includes a processor, memory, and one or more executable instructions stored on the memory and configured to be executed by the processor. The executable instructions includes instructions for a user interface that includes an asset display component comprising a visual representation of the asset. The user interface also includes a fault condition selection component comprising icons that represent one or more fault conditions for the asset. The user interface further includes a visual aid display component comprising one or more visual aids displaying fault data corresponding to selection of one of the icons from the fault condition selection component.

In yet another embodiment, a method for displaying an interface on a condition monitoring system is described. The method, when executed at an apparatus that has a processor and memory, includes steps for receiving an input that identifies a fault condition for an asset, selecting fault data in response to the input, and displaying the fault data in a visual aid on the interface.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
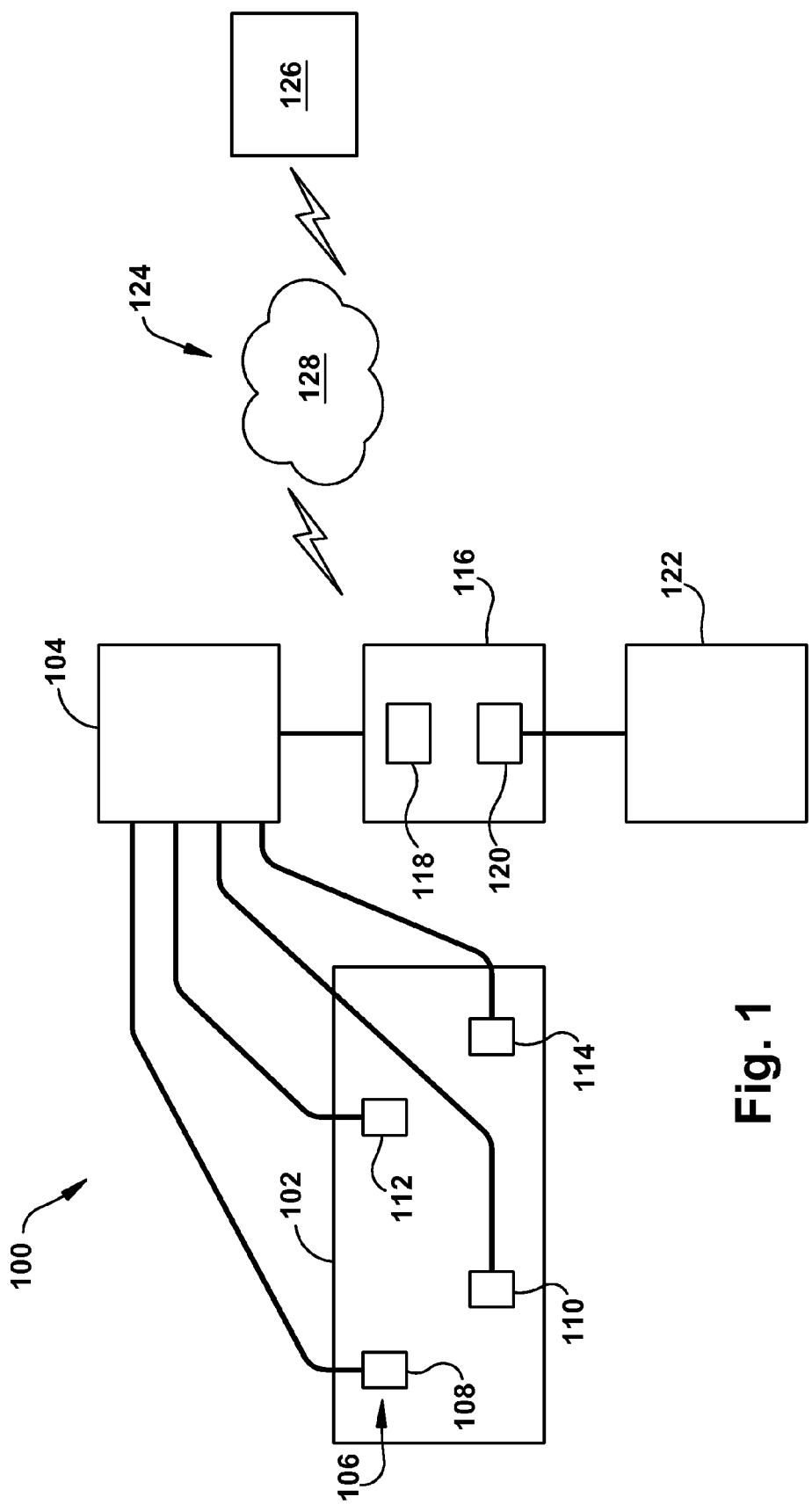
FIG. 1 is a schematic diagram of an exemplary embodiment of a condition monitoring system.

Referring now to the drawings, and particularly to FIG. 1, an exemplary embodiment of a condition monitoring system 100 is set forth with capabilities that improve fault detection and ensure proper maintenance and repair of an asset 102 (also "asset under test"). The condition monitoring system 100 has a measurement apparatus 104 to collect sensory signals such as position, vibration, pressure, and temperature from the asset 102. The measurement apparatus 104 can include a number of sensors 106 in addition to data acquisition hardware running compatible executable instructions (e.g., software and firmware) for effective data collection from the asset 102. In the present example, the sensors 106 include a first sensor 108, a second sensor 110, a third sensor 112, and a fourth sensor 114. Exemplary sensors can include proximity probes, accelerometers, acoustic emission sensors, pressure transducers, thermal couples, among many others.

The measurement apparatus 104 can communicate with a data processing unit 116 that has a repository 118 (e.g., memory, database, server, etc.) and a computing device 120 (e.g., a computer, laptop, etc). The data processing unit 116 can generate an interface 122 such as a graphical user interface (GUI) with one or more user screens that the end user can interact with, e.g., via the computing device 120. The condition monitoring system 100 may connect with a network system 124, which has one or more external devices 126 (e.g., an external server) coupled via a network 128.

The interface 122 displays data that the sensors 106 collect from the apparatus 102. The interface 122 provides a variety of visual aids (e.g., graphs, plots, charts, and tables) that present the data to the end user. These visual aids offer an effective snap-shot and/or operating history of the operation of the asset 102. To illustrate, in one implementation one or more of the sensors 106 measure vibration on the asset 102. The sensors 106 can include accelerometers (e.g., the first sensor 108, the second sensor 110, the third sensor 112, and the fourth sensor 114) in positions on or near bearings or other elements of the asset 102. The accelerometers generate signals in response to vibration during operation of the asset 102. The condition monitoring system 100 processes these signals, wherein processing includes generating plots of the signals on the interface 122 and/or the measurement apparatus 104. The data in the plots can represent data that the condition monitoring system 100 collects in real-time (e.g., during actual operation of the asset 102) or stored in memory or a combination real-time and stored data. Exemplary plots provide a visual representation of the vibration that occurs at the specific locations and/or elements, e.g., as a function of operating speed of the asset 102.

For improved diagnosis and monitoring of problems with the asset 102, the interface 122 arranges the plots and other visual aids as part of a general theme or, in one example, in a manner that relates the plots to a fault condition that occurs on the asset 102. Fault conditions identify problems in the asset 102 such as failure of a component (e.g., a bearing). The theme of the interface 122 may focus on diagnosis of a specific fault condition on the asset (e.g., a loose or misaligned shaft) or the theme may focus more broadly on the operation of the asset 102 (e.g., study for purposes of quantifying vibration). The thematic organization of the visual aids assists diagnosis of the fault conditions by providing a comprehensive collection of data from which the end user can ascertain anomalies in the operation of the asset 104. These anomalies often indicate whether the asset 102 presently exhibits the fault condition and/or the fault condition will avail itself in due course. In one example, the fault condition may define misalignment in a shaft and/or shaft coupling. Such misalignment may manifest itself as vibration. Implementation of the condition monitoring system 100 may locate one or more of the sensors 106 to collect data from bearings and other elements that are generally associated with the suspect shaft misalignment. The interface 122 may display the data from these sensors, wherein the collective format of the data permits the end user to more quickly and accurately diagnose the misalignment and effectively remedy the problem.

Figure 2:
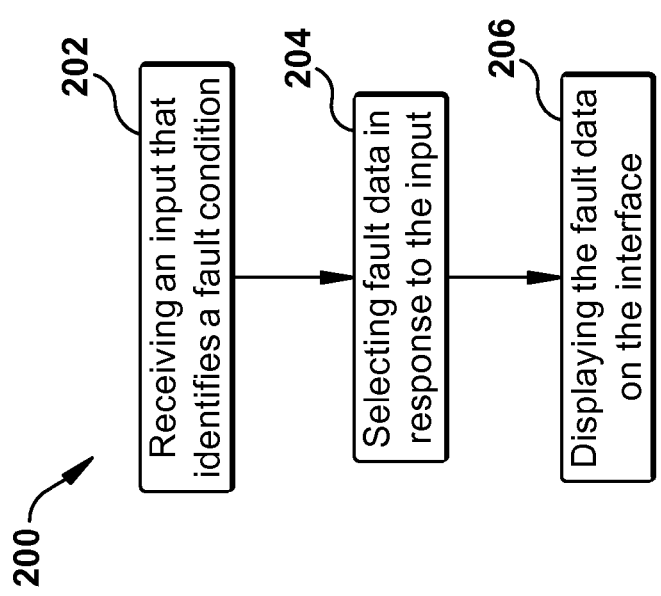
FIG. 2 is a flow diagram of a method of generating an interface for use with the condition monitoring system of FIG. 1.

With continued reference to FIG. 1, FIG. 2 illustrates an example of a method 200 for generating an interface, e.g., the interface 122 of FIG. 1. The method 200 includes, at block 202, receiving an input that identifies a fault condition, at block 204, selecting fault data in response to the input, and, at block 206, displaying the fault data on the interface. Executable instructions can code the various blocks of the method 200. Devices such as the computing device 120 (FIG. 1) can execute these instructions as software and/or firmware to generate the interface 122.

The input (e.g., at block 202) can arise from a number of sources. For example, the input can arise from one or more of selectable icons and menu items found on and/or as part of the interface 122. Although configurations of the icons can vary, in one example the interface 122 may only present icons for fault conditions that would be found on the asset 102.

Selection of fault data (e.g., at block 204) may occur in accordance with a table, a look-up table, a database, or other data format. This table can associate the asset 102 and/or the fault condition that the input identifies with the sensors 106 that will provide data indicative of the fault condition. The table may, in one example, also provide a listing of the visual aids that the interface 122 will display in response to the input.

An example of one illustrative table is shown as Table 1 and described below.

TABLE 1

| Asset | Fault condition | Sensors | Visual Aids |
|---|---|---|---|
| Asset 1 | Fault 1 | A, B, C | Type 1, Type 2, Type 3 |
|  | Fault 2 | A, B | Type 4, Type 5 |
|  | Fault 3 | A, C | Type 1, Type 4 |
| Asset 2 | Fault 4 | A, B, C, D | Type 1, Type 3, Type 4, Type 5 |
|  | Fault 5 | A | Type 1 |

The asset type defines the type of machine or instrument from which the inspection system collects data. Exemplary machines include turbines, pumps, motors, and combinations thereof. However, the concepts of the present disclosure are applicable to any type of machine as well as the various methodologies and techniques related to condition monitoring systems, asset monitoring systems, and systems that operate to provide diagnosis of problems on such machines.

Table 1 assigns different fault conditions (e.g., Fault 1, Fault 2, Fault 3, Fault 4, Fault 5, etc.) to each of the assets (e.g., Asset 1, Asset 2, etc.). Listings of the fault condition can be generated manually, wherein the fault conditions that the listing assigns to the assets is determined from previous and/or contemporaneous analysis and testing that indicates which types of assets are prone to which types of fault conditions. In other examples, the listing may be automatedly populated based on, for example, one or more algorithms that examine data (e.g., reliability data) over a period of time and correlate that data to fault conditions likely to occur on certain assets.

Table 2 below provides an exemplary listing of fault conditions illustrative of those fault conditions that the inspection system 100 can monitor.

TABLE 2

Shaft misalignment
Bearing misalignment
Unbalance
Resonance
Looseness
Rotor Rub
Variable air gap (eccentric rotor)
Broken/cracked rotor bar
Loose/open rotor bar
Stator deflection
Bearing faults (inner race, outer race, cage, or ball)
Shaft bending It is noted that the types of fault conditions may vary in connection with the characteristics of the asset 102 as well in connection with the elements that comprise the asset 102 itself. Although Table 2 and the present disclosure may discuss fault conditions specific to the asset 102, other illustrative listings of fault conditions may likewise find use herein. Exemplary fault conditions can include various conditions that are the result of wear and tear on elements of the asset over time. Fault conditions may target certain elements (e.g., bearings) that are known to develop and/or will develop wear-related problems that can manifest as measurable variables using one or more sensors (e.g., sensor 106). Thus, embodiments of the method 200 can implement one or more steps for selecting the correct measurement location and/or position of the sensors and for selecting the correct measurement type (e.g., scalar, vector, dynamic).

Display of the fault data (e.g., at block 206) can use the selection of visual aids that accompany the asset in the Table 1. The type of visuals aids can identify the construction of the corresponding plot that the interface 112 displays. Exemplary plots include line graphs, bar graphs, scatter plots, and the like. The type of visual aids can also identify features of the plot, wherein such features may define the plot as a trend plot, spectrum plot, and/or waveform plot.

An exemplary listing of plot types illustrative of plot types for use with embodiments of the inspection system 100 includes trend of overall velocity at inboard axial driver and inboard axial driven, phase difference between driver axial inboard vs. driven axial inboard, and velocity spectrum of driver axial inboard vs. driven axial inboard. Artisans having skill in the relevant condition monitoring and failure analysis will recognize these and other various plots.

In one embodiment, the method 200 can also include a step for displaying alarm levels or other indicators on the visual aids. The alarm levels can show a threshold value, e.g., for maximum allowable vibration as measured by an accelerometer. In one example, this feature permits the end user to compare the data in the plot against the alarm level. The threshold value may be set according to previous testing data. Selection of the alarm levels may occur in response to the input (e.g., at block 202), wherein data for alarm levels can be stored in a database or other repository and retrieved as desired. In one example, the look-up table of Table 2 may also include threshold values or other values that can be displayed on the plot and/or the interface 122 generally. For data displayed on the interface 122 in real-time, the method 200 may also include a step for displaying a fault signature, which can provide a visual indication or profile of a preferred set of data. The fault signature can overlay the plot of real-time data, thereby providing the end user with a visual guide to observe deviations in data from this preferred set.

The method 200 can also include one or more steps for selecting the fault conditions that are available as icons on the interface 122. As Table 1 shows above, the fault conditions may correspond to the asset. In one example, the fault conditions may correspond to the asset type (e.g., a motor, a pump, etc.) and/or other characteristics that define the asset. In other examples, the fault conditions may correspond to features that define the inspection system 100. These features may include the type and/or types of sensors, the position and placement of the sensors, as well as the type of instrumentation that the inspection system 100 may use to collect, store, process, and analyze data from the asset 102.

Figure 3:
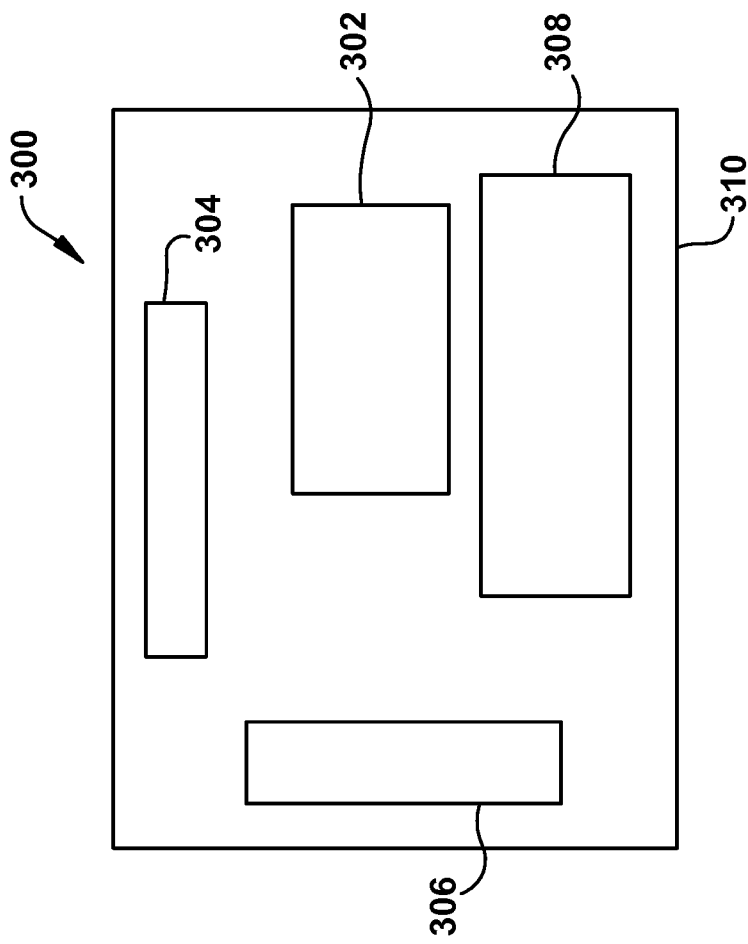
FIG. 3 is a schematic diagram of an example of an interface that can result from the method of FIG. 2.
Figure 4:
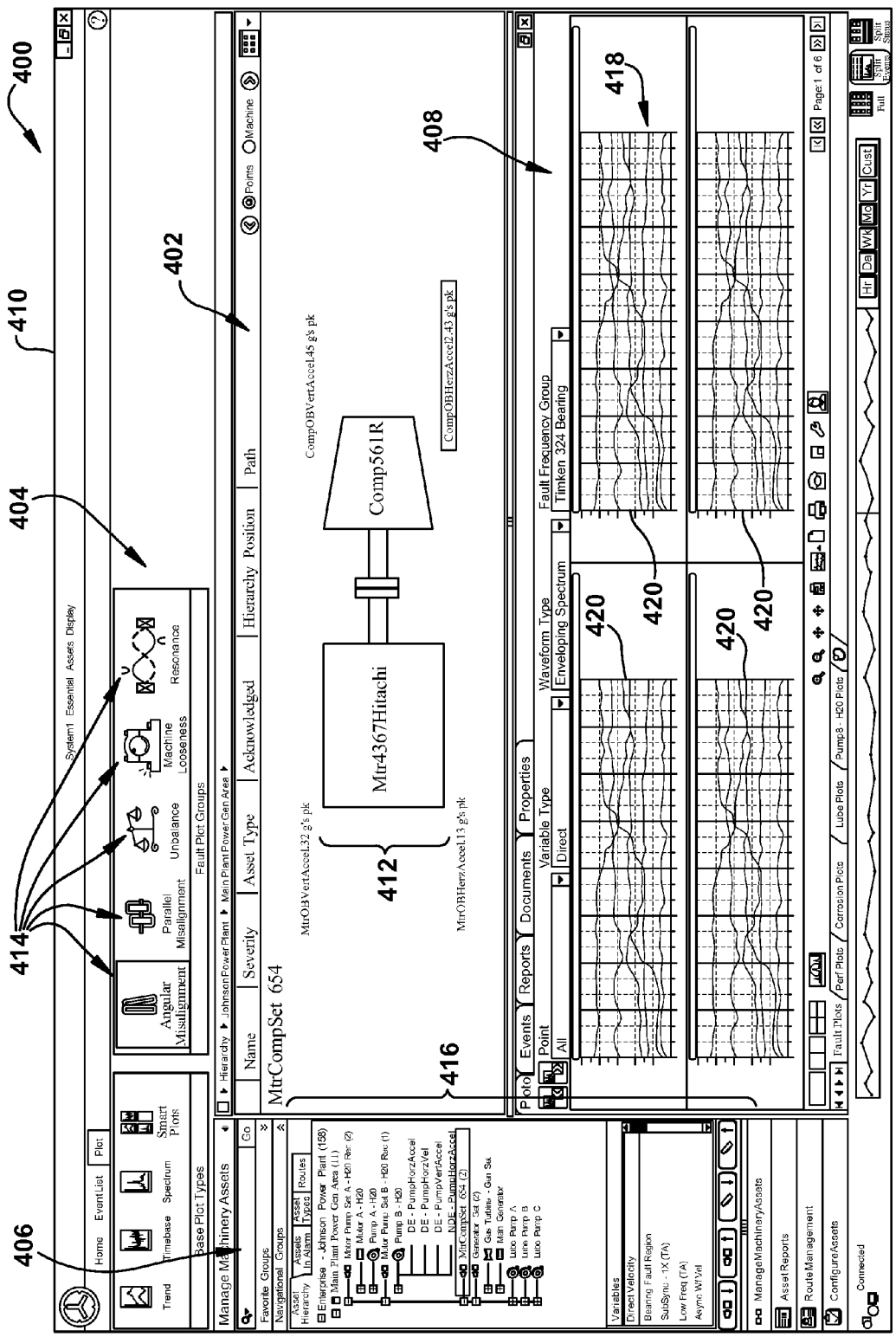
FIG. 4 is a schematic diagram of another example of an interface that can result from the method of FIG. 2.

FIGS. 3 and 4 illustrate an example of interface that display data in the form of the visual aids. As FIG. 3 broadly depicts, the interface 300 can include an asset display component 302, a fault condition selection component 304, an asset management component 306, and a visual aid display component 308. Collectively these components form a user screen 310, which provides the end user with interactive features to view and analyze data. These features can accommodate any number of fault conditions and, more particularly, can cooperate with the various measurement tools (e.g., the measurement apparatus 104 (FIG. 1)) that fault detection and condition monitoring systems may deploy.

The interface 400 of FIG. 4 shows, in more detail, one illustrative arrangement of the components as these components could appear on a user screen 410. Like the interface 300 of FIG. 3, the interface 400 includes an asset display component 402, a fault condition selection component 404, an asset management component 406, and a visual aid display component 408. In the present example, the asset display component 402 includes an asset representation 412 in the form of a schematic diagram of the asset under inspection. The fault condition selection component 404 includes a plurality of fault condition icons 414 (or "icons 414") that, in one example, enable the end user to change the data that the visual aid display component 408 displays. The asset management component 306 has an asset navigation tool 416 that permits the end user to navigate and operate the user interface 400. The visual aid display component 408 includes a plurality of visual aids 418, shown here as various plots 420 of data that corresponds to one of the fault condition icons 414.

The components of the interface 300, 400 are useful to present information to the end user. Although this disclosure describes several components, other components can embody features that enhance the functionality of the interface 300, 400. Illustrative features may allow the end user to select different sensors and monitoring equipment as well as to modify operation of the asset, e.g., by selecting different operating parameters (e.g., motor speed). Any features may embody one or more icons, menu items, and the like, and/or other visually representative item that is consistent with the user screen 310, 410.

The asset representation 412 provides a visual image of the asset, which may add context to the data that the end user views on the user screen 410. In addition to the box-like, schematic representation in this example, the asset representation 412 may also comprise an image, picture, or other diagrammatic view of the asset. In one embodiment, the asset representation 412 comprise interactive features that are responsive to selection by the end user, e.g., by selecting and clicking with a mouse. Selection of these interactive features may provide additional information about the asset in a pop-up or other supplementary dialogue box on the user screen 410. For example, for an asset that comprises elements such as a motor, a pump, and a shaft, the interactive features may permit the end user to individually select or scroll over the individual elements to display information (e.g., model number) pertinent to the element.

Icons for the fault condition icons 414 may represent any number of fault conditions that are, in one example, common to the asset under test. As FIG. 4 shows, the icons may include a visual depiction (e.g., picture, text, etc.) representative of the fault condition that the icon is assigned. The visual indication can distinguish the icons from one another. In one example, the icons embody a selectable button or other implement that the end user may select, e.g., by pointing and clicking with a mouse.

The asset navigation tool 416 can comprise any number of selectable menu items that can display a folder tree (shown) or other structure that organizes information and data such as the various assets on which monitoring may occur. The folder tree in the present example is shown as a listing of the various elements of the asset (e.g., pump, motor, shaft). Selection of one of the elements may change the content of the user screen 410, thereby providing additional and/or different content in one or more of the components (e.g., the asset display component 402, the fault condition selection component 404, etc.). The selectable menu items of the asset navigation tool 416 may also change the content of the user screen 410 and/or enable additional features for the end user. Illustrative menu items may permit printing of reports and data, configuring of assets under test, and the like.

Examples of the plots 420 include the line graphs shown in FIG. 4 as well as any other visually recognizable display of data (e.g., bar charts, pie charts, etc.). Collectively the plots 420 provide the end user with a comprehensive data set from which to identify the faults and/or fault conditions on the asset. Any number of plots 420 may be available for display, with one example of the visual aids 418 using four (4) displays of data indicative of the fault condition that the selected fault condition icon 414 represents.

In view of the foregoing, embodiments of the condition monitoring system and methods can provide a tool for asset diagnostics to improve maintenance and diagnosis of failures and failed components. A technical effect is to provide results in an interface for the end user, wherein the interface reflects a comprehensive set of data and/or data plots form which diagnosis can be obtained.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A condition monitoring system, comprising:
   a processor;
   a memory coupled to the processor; and
   one or more executable instructions stored on the memory and configured to be executed by the processor, the executable instructions comprising instructions that, when executed by the processor, cause the processor to:
      determine one or more potential faults for one or more assets based on sensor data;
      generate a user interface with asset icons and fault condition icons, wherein each fault condition icon visually depicts a fault condition for an asset, wherein each fault condition is based on the determined one or more potential faults;
      receive a user input that corresponds to a selection of one of the fault condition icons from an end user, wherein the user input identifies a particular fault condition for the asset;
      select fault data indicative of the particular fault condition in response to the user input; and
      display the fault data in one or more visual aids on the user interface,
   wherein the selection of one of the fault condition icons defines a theme for the user interface that configures a collection of data, including the one or more visual aids, for the end user to ascertain anomalies that occur during operation of the asset and which indicate the particular fault condition identified by the end user.

2. The condition monitoring system of claim 1, further comprising a plurality of sensors that can collect the fault data from the asset.

3. The condition monitoring system of claim 2, further comprising executable instructions for selecting a measurement location in response to the user input, wherein the measurement location defines a position on the asset for at least one of the sensors.

4. The condition monitoring system of claim 1, further comprising executable instructions that, when executed by the processor, cause the processor to display an alarm level on the visual aid, wherein the alarm level provides at least one threshold value indicative of a failure condition on the asset.

5. The condition monitoring system of claim 1, further comprising executable instructions that, when executed by the processor, cause the processor to display a fault signature on the visual aid, wherein the fault signature provides a visual indication of operation of the asset in real-time.

6. The condition monitoring system of claim 1, wherein the one or more visual aids are configured with data from previous testing of the asset.

7. The condition monitoring system of claim 1, wherein each fault condition comprises one of shaft misalignment, bearing misalignment, unbalance, resonance, looseness, rotor rub, variable air gap, broken rotor bar, cracked rotor bar, loose rotor bar, open rotor bar, stator deflection, bearing fault, and shaft bending.

8. An apparatus for monitoring operation of an asset, said apparatus comprising:
   a processor;
   a memory; and
   one or more executable instructions stored on the memory and configured to be executed by the processor, the executable instructions comprising instructions for generating a user interface comprising:
      an asset management component comprising asset icons;
      a fault condition selection component comprising fault condition icons that represent one or more fault conditions for the asset, wherein each fault condition icon visually depicts a fault condition for the asset, wherein each fault condition is based on one or more potential faults associated with one or more assets based on sensor data, the fault condition selection component configured to receive a user input that corresponds to a selection of one of the fault condition icons and identifies a particular fault condition for the asset; and
      a visual aid display component comprising one or more visual aids displaying fault data corresponding to the selection of one of the fault condition icons from the fault condition selection component,
   wherein the selection of one of the fault condition icons defines a theme for the user interface that configures a collection of data, including the one or more visual aids, for an end user to ascertain anomalies that occur during operation of the asset and which indicate the particular fault condition identified by the end user.

9. The apparatus of claim 8, wherein the user interface further comprises an asset navigation tool that has one or more menu items that organizes information and data for the asset.

10. The apparatus of claim 8, further comprising a plurality of sensors coupled to the processor, wherein the plurality of sensors can generate the fault data.

11. The apparatus of claim 8, wherein the fault data on the visual aids represents operation of the asset in real-time.

12. The apparatus of claim 8, wherein the fault data on the visual aids is retrieved from memory.

13. The apparatus of claim 8, wherein each fault condition comprises one of shaft misalignment, bearing misalignment, unbalance, resonance, looseness, rotor rub, variable air gap, broken rotor bar, cracked rotor bar, loose rotor bar, open rotor bar, stator deflection, bearing fault, and shaft bending.

14. A method for displaying an interface on a condition monitoring system including an apparatus having a processor and a memory, said method comprising:
    determining one or more potential faults for one or more assets based on sensor data;
    generating a user interface with asset icons and fault condition icons, wherein each fault condition icon visually depicts a fault condition for an asset, wherein each fault condition is based on the determined one or more potential faults;
    receiving a user input that corresponds to a selection of one of the fault condition icons from an end user and identifies a particular fault condition for the asset;
    selecting fault data indicative of the particular fault condition in response to the user input; and
    displaying the fault data in one or more visual aids on the user interface,
    wherein the selection of one of the fault condition icons defines a theme for the user interface that configures a collection of data, including the one or more visual aids, for the end user to ascertain anomalies that occur during operation of the asset and which indicate the particular fault condition identified by the end user.

15. The method of claim 14, further comprising determining the visual aid for displaying the fault data on the user interface.

16. The method of claim 14, further comprising displaying an alarm level on the visual aid, wherein the alarm level provides at least one threshold value indicative of a failure condition on the asset.

17. The method of claim 14, further comprising displaying a fault signature on the visual aid, wherein the fault signature provides a visual indication of operation of the asset in real-time.

18. The method of claim 14, further comprising selecting a measurement location in response to the user input, wherein the measurement location defines a position for at least one sensor on the asset.

19. The method of claim 14, further comprising selecting a measurement type in response to the user input, wherein the measurement type defines at least one feature of the visual aid.

20. The method of claim 14, further comprising determining the fault conditions that are available based on instrumentation that is coupled to the asset.

21. The method of claim 14, further comprising retrieving the fault data from memory.

22. The condition monitoring system of claim 14, wherein the one or more visual aids are configured with data from previous testing of the asset.

23. The method of claim 14, wherein each fault condition comprises one of shaft misalignment, bearing misalignment, unbalance, resonance, looseness, rotor rub, variable air gap, broken rotor bar, cracked rotor bar, loose rotor bar, open rotor bar, stator deflection, bearing fault, and shaft bending.

* * * * *